United States Patent [19]
Dauenhauer et al.

[11] Patent Number: 5,178,016
[45] Date of Patent: Jan. 12, 1993

[54] SILICON PRESSURE SENSOR CHIP WITH A SHEAR ELEMENT ON A SCULPTURED DIAPHRAGM

[75] Inventors: Dennis A. Dauenhauer, San Jose; Hans Reimann, Sunnyvale, both of Calif.

[73] Assignee: Sensym, Incorporated, Sunnyvale, Calif.

[21] Appl. No.: 710,253

[22] Filed: Jun. 3, 1991

Related U.S. Application Data

[63] Continuation of Ser. No. 437,468, Nov. 15, 1989, abandoned.

[51] Int. Cl.⁵ .............................................. G01L 9/06
[52] U.S. Cl. ..................................... 73/727; 73/708; 73/721; 338/4
[58] Field of Search ............... 73/708, 721, 727, 754, 73/DIG. 4; 338/4, 42

[56] References Cited

U.S. PATENT DOCUMENTS

| | | |
|---|---|---|
| 3,213,681 | 10/1965 | Pearson . |
| 3,341,794 | 9/1967 | Stedman ................................... 338/4 |
| 4,065,970 | 1/1978 | Wilner . |
| 4,116,075 | 9/1978 | Ort ........................................... 338/4 |
| 4,236,137 | 11/1980 | Kurtz et al. . |
| 4,317,126 | 2/1982 | Gragg, Jr. . |
| 4,528,855 | 7/1985 | Singh ........................................ 338/4 |
| 4,667,516 | 5/1987 | Schulz ..................................... 73/708 |
| 4,672,853 | 6/1987 | Hickox .................................... 73/708 |
| 4,771,639 | 9/1988 | Saigusa et al. .......................... 73/727 |
| 4,813,272 | 3/1989 | Miyazaki et al. ....................... 73/727 |
| 4,911,016 | 3/1990 | Miyazaki et al. ....................... 73/708 |
| 4,972,716 | 11/1990 | Tobita et al. ............................ 73/721 |

FOREIGN PATENT DOCUMENTS

1397829  5/1988  U.S.S.R. ................................. 73/727

*Primary Examiner*—Jin F. Ng
*Assistant Examiner*—Brent A. Swarthout
*Attorney, Agent, or Firm*—Skjerven, Morrill, MacPherson, Franklin & Friel

[57] ABSTRACT

A silicon pressure sensor chip has a shear element on a sculptured diaphragm. The shear element is a piezoresistive four-terminal resistor which is oriented so as to respond to the in-plane shear stress component in the diaphragm. The shear element is located on a thick shelf which is a portion of the sculptured diaphragm, which also has a thinner portion. This diaphragm configuration increases the bending moment at the location of the sensing element through the load of the thin portion of the diaphragm, which is suspended along the periphery of the thick shelf.

13 Claims, 9 Drawing Sheets

SILICON PRESSURE SENSOR CHIP WITH A SHEAR ELEMENT ON A SCULPTURED DIAPHRAGM

This application is a continuation of application Ser. No. 07/437,468, filed Nov. 15, 1989, now abandoned.

BACKGROUND OF THE INVENTION

1. Field of the Invention

This invention relates to a silicon pressure sensor chip. More specifically, this invention relates to a silicon pressure sensor chip using a shear element located on a thick portion of the diaphragm.

2. Description of the Prior Art

Silicon pressure sensor chips are well known in the art. Typical prior art sensor chips have a shear element, i.e., a piezo-resistive sensing element, placed on a square diaphragm of constant thickness, or alternatively use a Wheatstone bridge with resistors located in thin flexure areas of a sculptured diaphragm. The use of a sculptured diaphragm for improved sensor performance is described in U.S. Pat. No. 4,065,970 issued Jan. 3, 1978 to Wilner This disclosure describes a diaphragm for a pressure transducer having a surface sculptured by anisotropic etching to provide gauge areas in the form of narrow thin flexure areas between thick areas in the form of islands. Also, U.S. Pat. No. 4,236,137, issued Nov. 25, 1980 to Kurtz, et al. describes (See FIG. 1) a silicon chip 2 (in original) serving as a pressure transducer with a back surface 4 in which is located a central boss 6 (12 in original) of a trapezoidal cross-section surrounded by a groove 8 (11 in original) of a particular width. Piezo-resistive sensing elements (not shown) are formed on the front surface 10 in the ring-shaped diaphragm defined by groove 8.

In both of the above disclosures, anisotropic silicon etching provides stress concentration in thin flexure areas in which the piezo-resistive sensing elements are located. In both cases, the devices are optimized to generate uniform maximal stresses for longitudinal and transverse piezo-resistors connected to a Wheatstone bridge.

In U S. Pat. No. 4,236,137 it was noted that the problems of intrinsic diaphragm stresses due to the thermal mismatch between silicon and thin surface films presents a problem. The stress is noted as being increased if the thickness of the silicon flexures is reduced for purposes of stress concentration.

Figure 1:
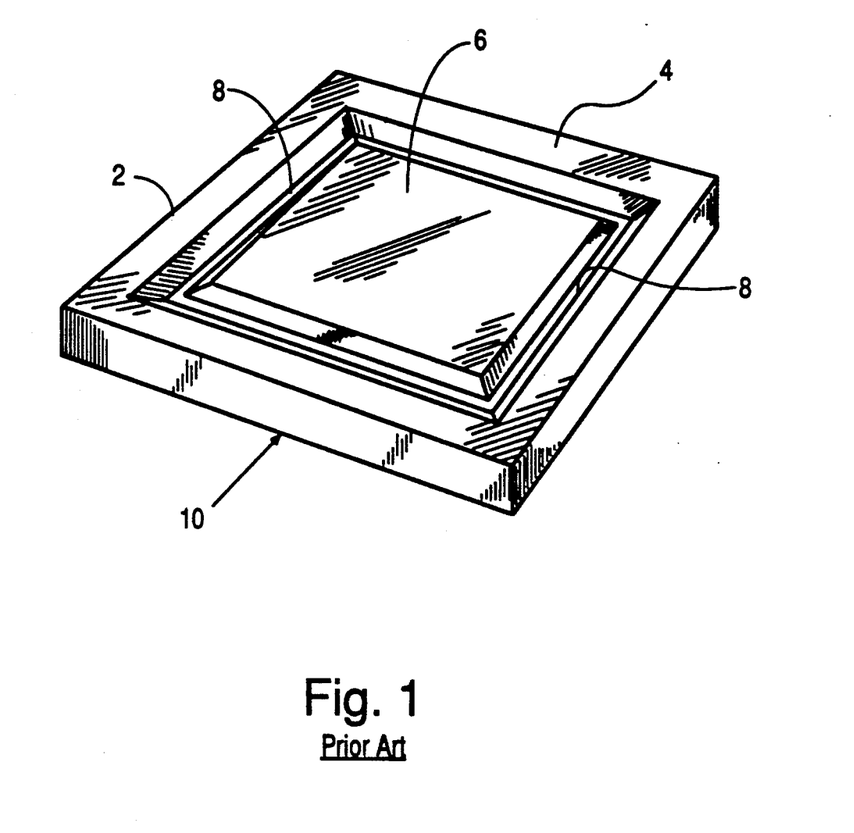
FIG. 1 shows a typical prior art silicon pressure sensor chip.

Therefore the prior art of FIG. 1 typically places the sensor elements on a thin portion of the diaphragm, because the thick portion of the diaphragm does not provide enough sensitivity. This prior art structure therefore disadvantageously increases stresses in the diaphragm from secondary effects, which worsens the problems of voltage offset and hence produces a sensor with significant deficiencies.

Figure 2:
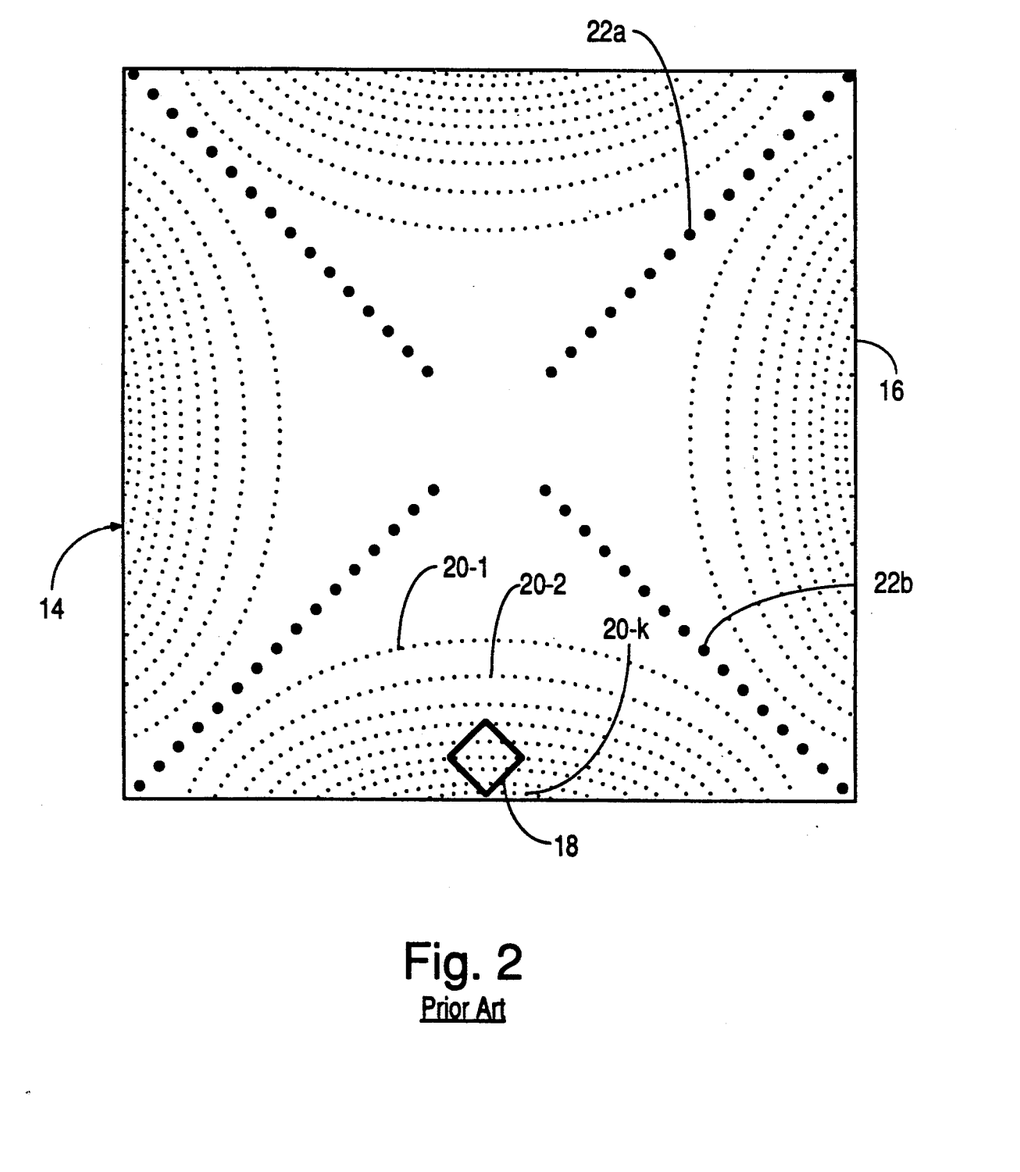
FIG. 2 shows a simulated distribution of shear stress for a prior art square diaphragm of constant thickness.

FIG. 2 shows a computer-simulated distribution of shear stress for a prior art square diaphragm 14 of constant thickness (thus differing from that shown in FIG. 1) with built-in edges 16, piezo-resistive shear element 18 in the form of a four-point resistor, and contours 20-1, 20-2, . . . 20-k of constant shear stress magnitude shown by dotted lines caused by a pressure difference across the diaphragm 14.

FIG. 2 shows contours by the dotted lines 20-1, 20-2, . . . 20-k for ten different stress levels with constant stress increase. Zero stress is formed along the diagonals 22a, 22b of the diaphragm 14. Increasing stress levels lead to points of maximum stress at the midpoints of the diaphragm edges. Thus, there is shown a four-fold symmetry of the square diaphragm. This symmetry of the structure of FIG. 2 is used in the prior art to place four different shear elements on the diaphragm.

SUMMARY OF THE INVENTION

In accordance with the invention, a silicon pressure sensor chip is provided having stress concentrations formed by locating the piezo-resistive sensing element on a thick shelf of the diaphragm of the sensor chip and increasing the bending moment on the shelf through the load of a thin diaphragm suspended along the periphery of the shelf.

An objective of the invention is to provide an improved pressure sensor chip with higher sensitivity and lower voltage offset, without increasing the size of the chip over prior art chips. Another objective of the invention is to provide an improved pressure sensor chip which is relatively easy and inexpensive to manufacture.

Another objective of the invention is to provide a pressure sensor chip which uses a point-like sensor element rather than a Wheatstone bridge.

The silicon pressure sensor chip in accordance with the invention provides the following advantages over a Wheatstone bridge-type chip:

Temperature gradients present between individual resistors in a Wheatstone bridge are reduced for the point-like shear element in accordance with the present invention.

Gradients in implant parameters during fabrication which result in variations of resistance and of temperature coefficients are reduced for the point-like shear element.

Resistor mismatch due to lithography and resistor interconnects are eliminated. Therefore, each of the above factors leads to a lower offset and better reproducibility for the present invention over a Wheatstone bridge type structure. In summary, the structure in accordance with the invention has the advantages of a high sensitivity combined with a low offset, hence eliminating the need for elaborate trim schemes for offset voltage, temperature dependence of offset, and, as discussed below, temperature dependence of sensitivity.

BRIEF DESCRIPTION OF THE DRAWINGS

FIGS. 8a to 8d show fabrication of the pressure sensor chip of FIG. 5a.

Identical reference numbers in various figures denote identical or similar structures.

DETAILED DESCRIPTION OF THE INVENTION

Figure 3:
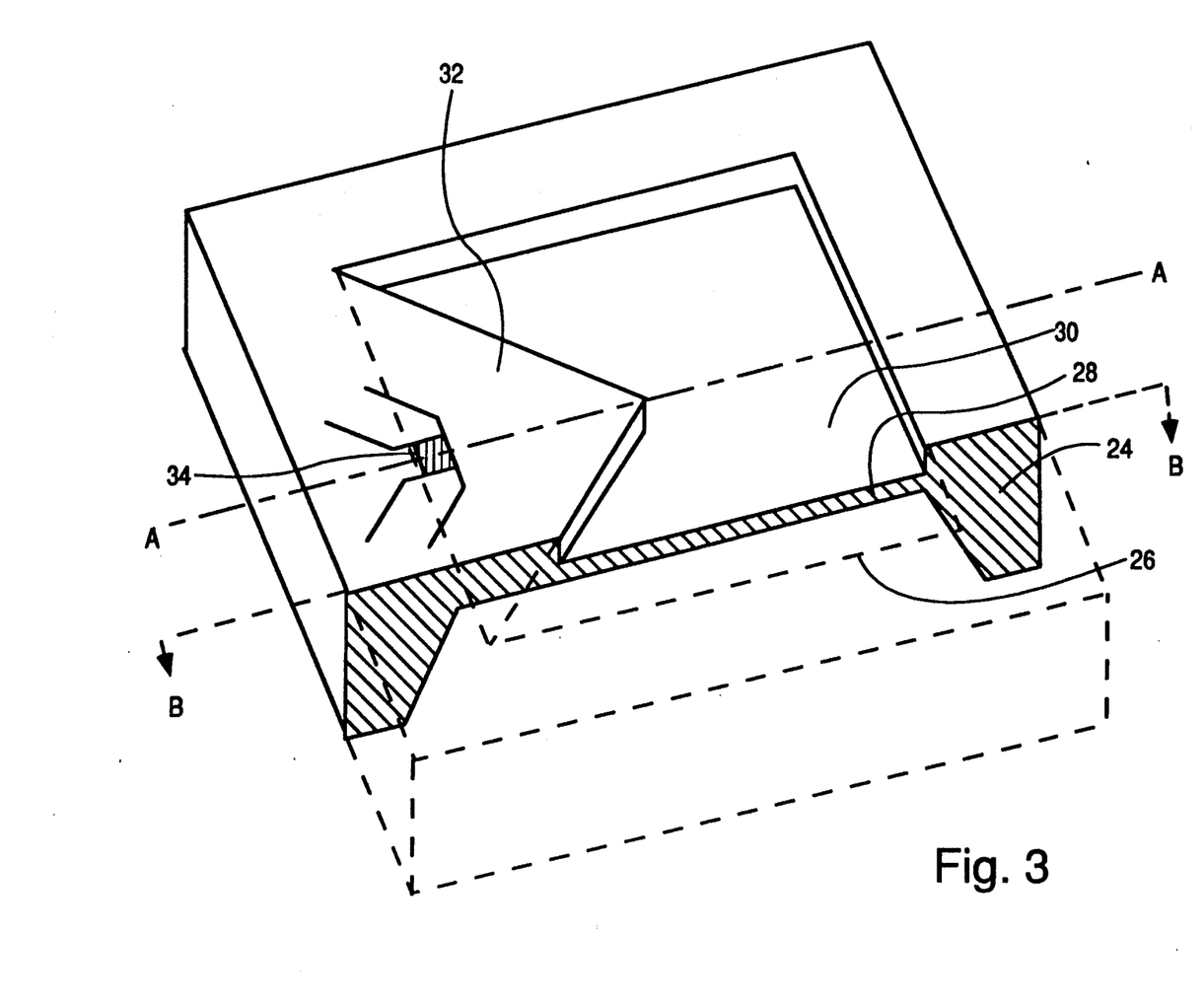
FIG. 3 shows a perspective view of a silicon pressure sensor chip in accordance with the invention.

FIG. 3 shows a perspective view of a silicon pressure sensor chip in accordance with the invention. As shown, the device is preferably a square chip with symmetry axis line A—A. A partial cross-section is shown at 24 along line B—B. A cavity 26 on the backside of the chip defines a square diaphragm 28 which is sculptured by a front recess 30 to form a thick triangular shelf 32 for the sensing element 34.

In accordance with the present invention, one-fourth of the diaphragm 28 is used for one shear element 34, and the remaining part of the diaphragm 28 is modified by recess 30 to enhance the performance of the sensor.

Figure 4:
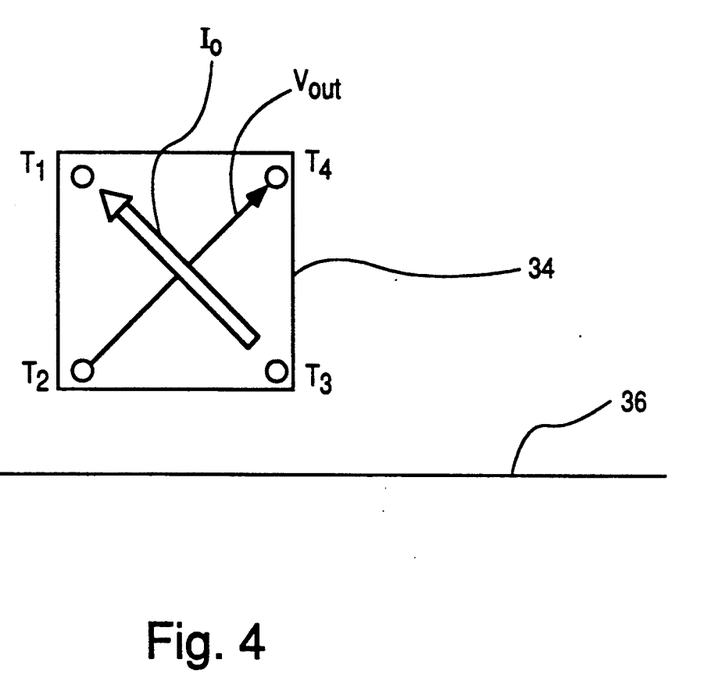
FIG. 4 shows a shear element in accordance with the invention.

The orientation of the shear sensing element 34, in accordance with the invention, is preferably as shown in FIG. 4. The current direction $I_o$ and voltage direction $V_{out}$, as well as the reference axes for the shear stress contours in FIG. 4 are parallel to the {100} directions of the silicon crystal which forms the substrate of the pressure sensor chip. The diaphragm edge 36 is parallel to the sensing element 34 and aligned to the {110} directions.

FIG. 4 shows a symmetric shear element 34 which is a four-terminal resistor with current flow $I_o$ between input terminals T3 and T1 and a differential output voltage $V_{out}$ between the output terminals T2 and T4. Without shear stress and with perfectly aligned output terminals T2, T4, the output voltage $V_{out}$ equals zero. The direction of current flow $I_o$ between terminals T1 and T3 is at a 45° angle to the edge 36 of the diaphragm.

The differential output voltage $V_{out}$ of the sensing element 34 of FIG. 4 is given by the equation:

$$v_{out} = V_{in}(O + S \times P)$$

where $V_{in}$ is the supply voltage across the input terminals T1 and T3, 0 is the chip offset voltage, S is the chip sensitivity, and P is the pressure difference across the diaphragm. 0 is ideally zero but will have a finite value due to a prestressed diaphragm or a slight asymmetry in the layout of the sensing element.

The intrinsic diaphragm stress is caused by the wafer processing, thermal mismatch between the silicon and thin surface films (e.g., silicon oxide), and by the bending of the chip caused by improper die attachment. Both S and 0 are temperature dependent with temperature coefficients described by the following equations:

$$S(T) = S_O(1 + TCS(T - T_O) + \ldots)$$

$$O(T) = O_O + TSO(T - T_O) + \ldots),$$

where $T_O$ is the reference temperature used for the definition of $S_O$, $O_O$ and the temperature coefficients of sensitivity, TCS, and offset, TSO. T is the device temperature. The equations are written without the quadratic terms for simplicity.

Figure 5A:
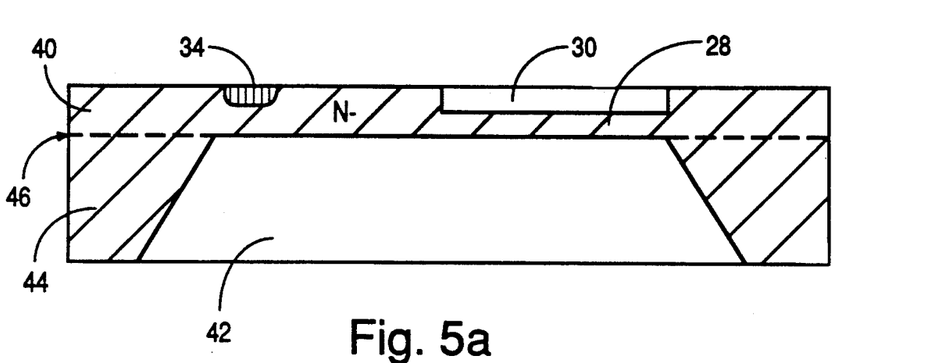
FIGS. 5a and 5b respectively show cross-sections for two pressure sensor chips in accordance with the invention.

FIG. 5a shows a cross-section of the chip shown in FIG. 3 along line B—B of FIG. 3. As shown in FIG. 5a, the sensor element 34 is a conventional P type implant. The top side recess 30 in upper layer 40 is conventionally formed by reactive ion etching. The upper layer 40 is an N-type epitaxial layer conventionally formed on a substrate 44 The cavity 42 in the backside of substrate 44 which defines the diaphragm 28 is formed by conventional anistropic silicon etching with an electrochemical etch stop at the substrate/epitaxial layer interface 46. Fabrication of this structure is described below.

Figure 5B:
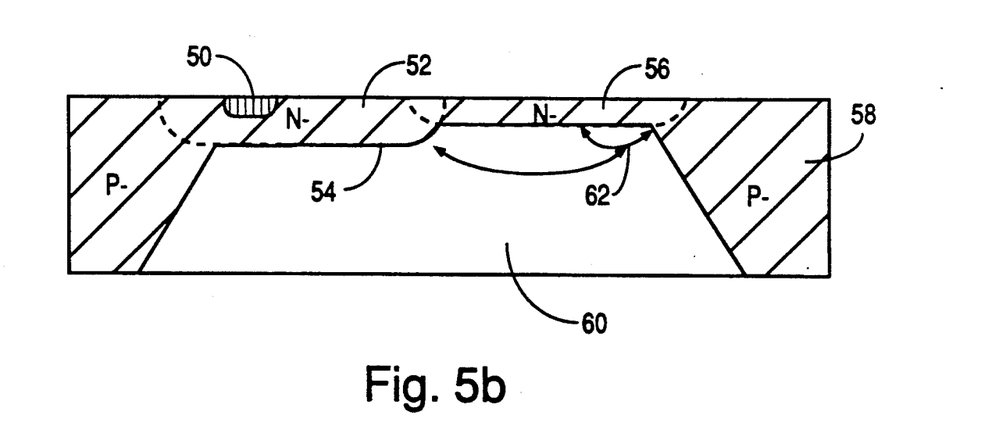

Another embodiment of the present invention is shown in FIG. 5b in cross-section. Sensing element 50 is a P type implant conventionally formed in an N- type diffusion 52 with a junction depth equal to approximately the thickness of the shelf 54 in which the sensing element 50 is formed. The thinner portion 56 of the diaphragm is formed by a second N-type diffusion with a junction depth equal to approximately the thickness of the thin diaphragm portion 56. The remainder of the structure is a P- type substrate 58. The cavity 60 which defines the diaphragm 56 is formed conventionally by anistropic silicon etching with an electrochemical etch stop 62 at the P/N junction. Thus, a conventional dopant dependent etching process is used. Fabrication of this structure is described below.

Figure 6:
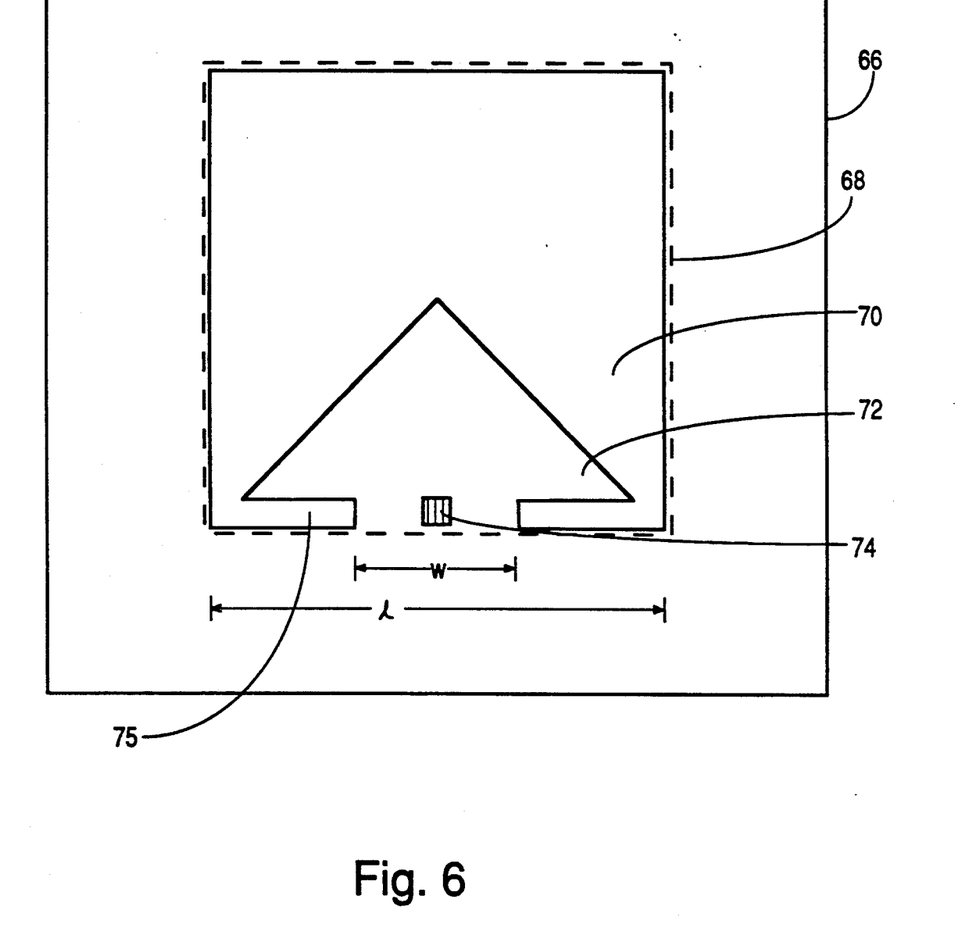
FIG. 6 shows a top view of an additional embodiment of the invention.

FIG. 6 shows in top view another embodiment of the invention. The chip 66 includes the bottom of the cavity 68 denoted by the dotted line, the front recess 70, and the triangular thick shelf 72 in which the sensing element 74 is formed. The shelf 72 has a width at its base of "w" and the overall width of the diaphragm is dimension "1". Extending the recess 70 as shown near to the sides of the sensing element 74 reduces the effective moment of inertia of the triangular shelf 72 by reducing the base width from 1 to w. The stress is thereby increased by a factor of 1/w, neglecting small effects from the thin diaphragm area 75.

Figure 7:
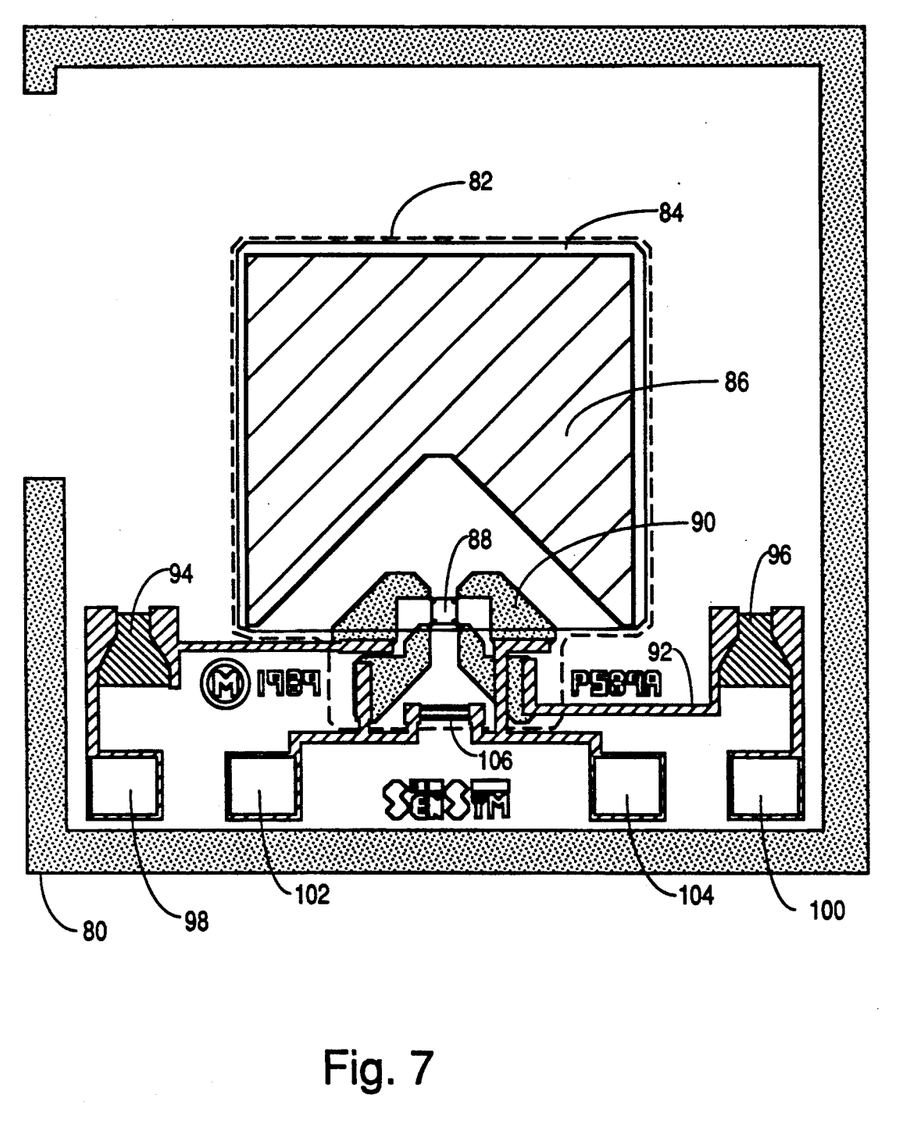
FIG. 7 shows a detailed top view of one embodiment of the invention.

FIG. 7 shows in a top view a sensor chip 80 in accordance with the invention as used for a blood pressure measurement system. Shown is a window 82 of reduced oxide thickness (the dotted line), passivation layer window 84, recess 86, shear element 88, diffused interconnect 90, metal interconnect 92, two thin film resistors 94, 96 each with a temperature coefficient of zero which are laser-trimmed for sensitivity calibration, a first input terminal 98, a second input terminal 100, two output terminals 102, 104, and a load resistor 106 conventionally implanted together with the sensing element.

For a conventional square chip (not shown) having the dimensions of chip 80 of 2.1 millimeters (mm) on each side and a square diaphragm 1.0 mm on each side, but with a constant diaphragm thickness of approximately 25 microns, the sensitivity is 13 $\mu V/V$ per millimeter of mercury [mmHg]. Etching a recess 86 of 10 micron depth as in chip 80 increases the sensitivity to 40 ($\mu V/V$)/mmHg. Chip 80 is designed for a pressure range of 0 to 300 mmHg. The burst pressure is typically over 25 times full scale pressure (150 psi) and the pressure nonlinearity expressed as the maximum deviation from an end point straight line is typically better than 0.3% full scale.

One application for chip 80 is a blood pressure transducer as specified by the Association for the Advancement of Medical Instrumentation (AAMI). The application specifies a sensitivity of 5.00 ($\mu V/V$)/mmHg. This is a reduction of a factor of eight for the chip with a sensitivity of 40 ($\mu V/V$)/mmHg. The voltage divider at the output, i.e., the implanted load resistor 106, in parallel with the output of the shear element 88 reduces the chip sensitivity. Since the load resistor 106 is preferably formed at the same time as is the piezo-resistive shear sensing element 88, load resistor 106 has the same temperature characteristics as shear element 88 and so does not change the temperature coefficient of sensitivity.

Load resistor 106 is designed to adjust the output impedance of the chip 80 to the required 350Ω. With a typical resistance of 460Ω for the shear element 88, this requires a load resistor 106 of 146Ω and reduces the chip sensitivity by 24% from 40 to about 30 ($\mu$V/V)/mmHg. With the voltage divider resistors at the input, i.e., the laser trimmed thin film resistors 94, 96 in series with the input of the sensing element 88, the output voltage of the chip 80 is calibrated to the required sensitivity of exactly 5.00 ($\mu$V/V)/mmHg. This calibration, at the same time, automatically adjusts the temperature coefficient of sensitivity, TCS; a consequence of the different temperature coefficients of resistance, TCR, in the voltage divider resistors 94, 96, and in the sensing element 88. In one example, with typical values for the shear element 88 (TCR = +2500 ppm/°C., TCS = −2200 ppm/°C.) and for the thin film resistors 94, 96 (TCR =0), the result for chip 80 is TCS = −110 ppm/°C., well below the specification of ±1000 ppm/°C. for the application.

The scaling of the sensitivity by a factor of eight, at the same time, reduces the offset voltage and its temperature dependence by the same factor. Since the recessed edge 86 of the sculptured diaphragm does not introduce an additional stress, but rather isolates the sensing element 88 from some intrinsic stress components, a typical chip offset of 2 mV/V and a TC-offset of 5 (($\mu$V/V)/°C. is now effectively reduced to 0.25 mV/V and 0.63 ($\mu$V/V)/°C., respectively. This is equivalent to an offset of 50 mmHg and a TC-offset of 0.125 mmHg/°C., both values well below the required performance limits of ±75 mmHg and ±0.3 mmHg/°C., respectively. In the calculation of this value a cross term between offset and TCR has been neglected. In the case of this chip, offset and TC-offset have opposite signs, so that the above value is a worst-case estimate.

The fabrication of integrated pressure sensors as is known in the art is a batch process. Typically, over a thousand chips are laid out side by side on a silicon wafer of 100 mm diameter, and 20 wafers are processed as a lot.

A silicon wafer substrate 112, which can be either P or N type (see FIG. 8a), has an N- type eptiaxial layer 114 conventionally formed on substrate 112. P+type region 116 and P type region 118 are formed conventionally using photolithography, ion implantation, and diffusion; regions 116, 118 are respectively the diffused interconnnect and the sensor element. A thick layer of silicon oxide 120 formed thermally lies over the epitaxial layer 114, except over the diaphragm area. A layer 121 of silicon oxide (about 5,000 Å thick) formed by deposition serves as a passivation layer; silicon oxide layer 121 does not extend over the bonding pads and diaphragm area. One bonding pad 122 is shown; the bonding pads are preferably aluminum and formed by conventional metal deposition.

Figure 8A:
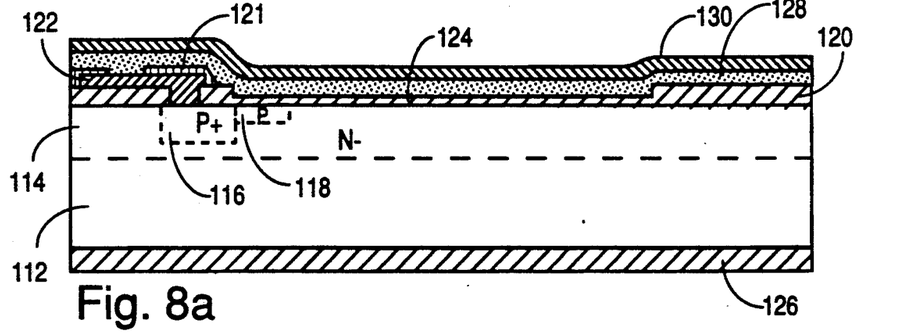

A thin layer 124 (about 2000 Å thick) of silicon oxide lies over the diaphragm area and is formed conventionally by thermal oxidation. The backside of the substrate is covered with a thick layer of thermally grown silicon oxide 126, about 10,000 Å thick.

Two different processes are described below for the subsequent micromachining of the sculptured diaphragm. The first process is the etching of a recess to form a sensor chip as in FIG. 5a. In this case, the substrate 112 (see FIG. 8a) is a (100)-silicon wafer, polished on both sides, with an N- type epitaxial layer 114 of a thickness approximately equal to the targeted thickness of the thick part of the diaphragm (shelf).

After completion of the frontside processinq as described above, two masking and protection layers are deposited on the frontside of the wafer; first, a silicon nitride layer 128 10,000 Å thick is formed by plasma deposition, and then a chromium metal layer 130 3000 Å thick is formed by sputter deposition.

Figure 8B:
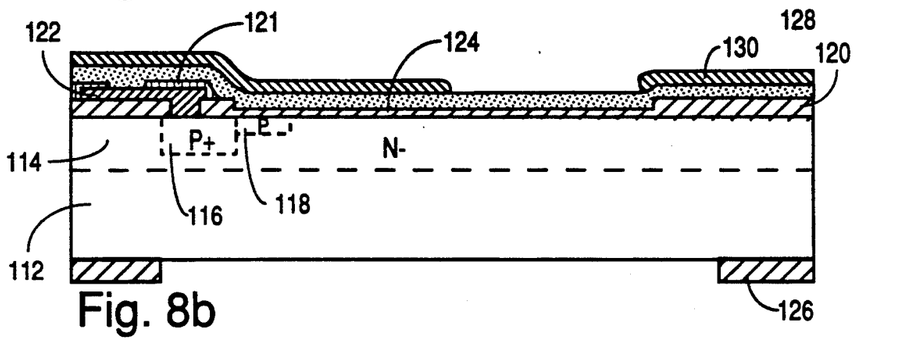

Next, two masking steps are performed (see FIG. 8b). A cavity mask at the backside of substrate 112 opens the silicon oxide layer 126. A recess mask at the frontside of substrate 112 opens the chromium layer 130, but not the silicon nitride protection layer 128.

Figure 8C:
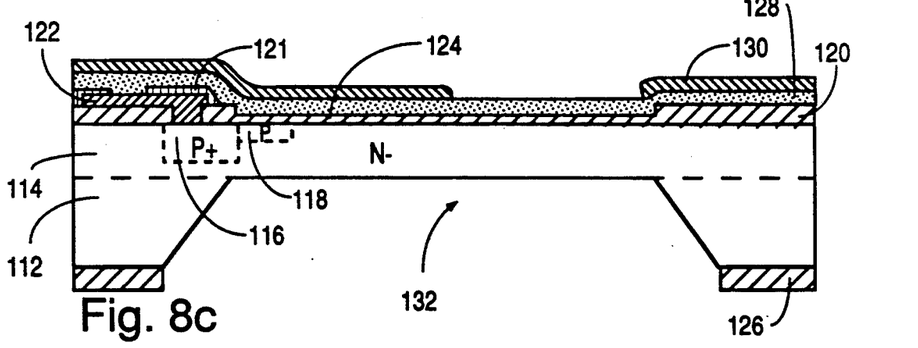

Next, a cavity 132 in substrate 112 is etched in two steps (see FIG. 8c). First, substrate 112 is deeply etched by an anisotropic etchant, then substrate 112 is subject to an electrochemical etching step with an automatic etch stop at the interface between substrate 112 and epitaxial layer 114.

Figure 8D:
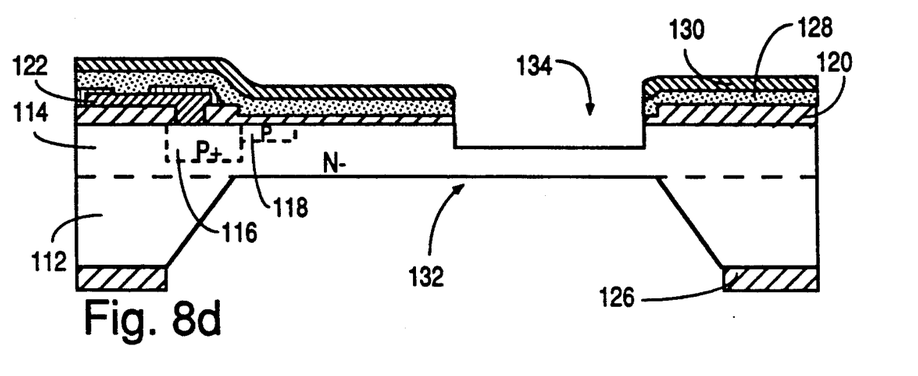

Then (see FIG. 8d) the nitride protection layer 128 and the thermal silicon oxide layer 124 are removed from the recess opening 134 at the substrate 112 frontside, and reactive ion etching (RIE), preferably in an $NF_3$ plasma, is used to etch the front recess 134 using the chromium layer 130 as a masking layer. Finally, the chromium layer 130 and nitride layer 128 are stripped from the substrate 112 frontside. This completes the micromachining of the silicon wafer.

Figure 9A:
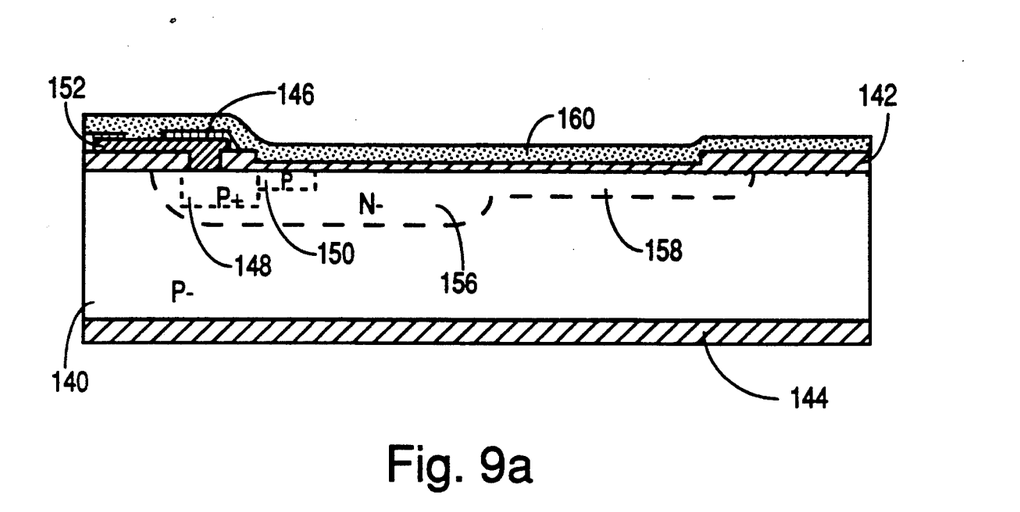
FIGS. 9a and 9b show fabrication of the pressure sensor chip of FIG. 5b.

A second process for the micromachining offers more flexibility for the layout of the sensing element relative to the thin diaphragm area, by moving the diaphragm recess to the bottom of the cavity to form the sensor chip of FIG. 5b. For this process, the starting material (see FIG. 9a) is a P- type (100)-silicon wafer substrate 140, polished on both sides, without an epitaxial layer. The structure includes conventionally formed frontside thermally grown thick silicon oxide layer 142, backside thermally grown thick silicon oxide layer 144, frontside thin thermally grown silicon oxide layer 146, P+type interconnect region 148, P type sensor region 150, and aluminum bonding pad 152. The thick shelf and the thin diaphragm areas are defined during the above-described frontside processing by two N- type diffusions, a deeper diffusion 156 with a junction depth of the targeted shelf thickness and a shallower diffusion 158 with a junction depth of the desired thin diaphragm thickness. After completion of the frontside processing, the frontside of the substrate 140 is protected with a layer of silicon nitride 160.

Figure 9B:
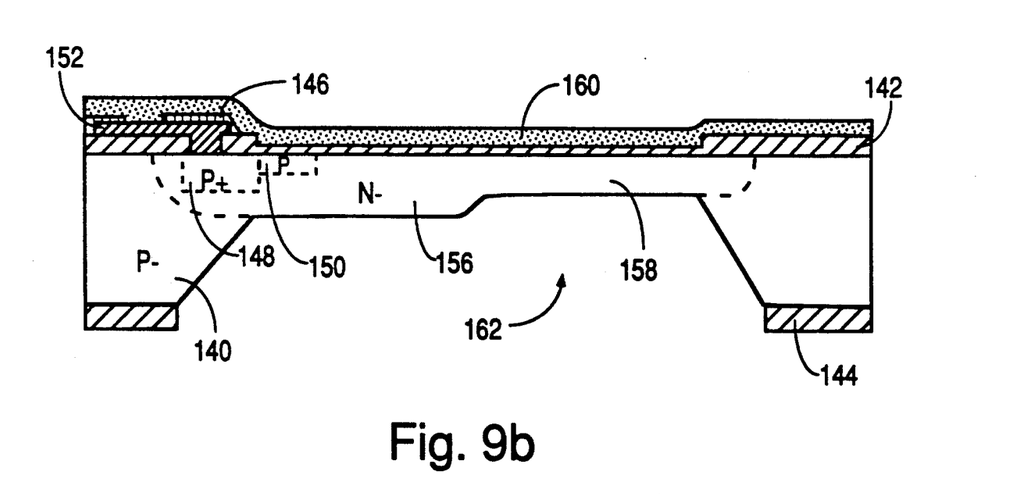

The micromachining of the sculptured diaphragm is completed by etching (see FIG. 9b). Using the technique of doping selective silicon etching, a cavity 162 is etched so that cavity 162 stops at the junctions of the N- type diffusions 156, 158. Electrochemical and doping selective silicon etching and the necessary fixturing are disclosed in Y. Linden et al., "Fabrication of Three-dimensional Silicon Structures by Means of Doping-Selective Etching (DSE)" in *Sensors & Actuators*, 16 (Elsevier Sequoia, 1989), pgs. 67–82, incorporated herein by reference.

The above description of the invention is illustrative and not limiting. Further embodiments of the invention will be apparent to one of ordinary skill in the art in the light of the disclosure and appended claims.

We claim:

1. A pressure sensor having only one point-like sensing element and comprising:

a single monocrystalline silicon diaphragm capable of flexing in response to pressure changes and having a first portion having a predetermined thickness, and a second portion having a predetermined thickness less than that of the first portion; and said one point-like sensing element formed entirely in said first portion of said diaphragm, wherein an electrical resistance of said sensing element varies with the pressure changes on said second portion of said diaphragm.

2. The device of claim 1, wherein said diaphragm is of a first conductivity type, and said sensing element is of a second conductivity type opposite to that of the first conductivity type.

3. The device of claim 1, wherein said sensing element comprises:

first and second electrical terminals to said sensing element by which a current can be provided to said sensing element in a plane of said diaphragm; and third and fourth electrical terminals to said sensing element located on opposite sides of and along a line approximately perpendicular to a line between said first and second terminals, said third and fourth terminals permitting detection and measurement of a voltage generated in response to the pressure changes on said diaphragm.

4. The device of claim 3, wherein said line between said first and second terminals is at an angle of about 45° to a line defined by an adjacent edge of said diaphragm.

5. The device of claim 1, wherein said diaphragm is formed in a substrate and said diaphragm is defined by a cavity formed in a surface of said substrate opposing a surface of said substrate in which said sensing element is formed.

6. A pressure sensor chip comprising:

a monocrystalline silicon diaphragm capable of flexing in response to pressure changes and having a first portion havign a predetermined thickness, and a second portion having a predetermined thickness less than that of the first portion; and a piezo-resistive sensing element formed in said first portion of said diaphragm, whereby an electrical resistance of said sensing element varies with the pressure changes on said diaphragm;

wherein said first portion of said diaphragm is triangular in shape in a plane of said diaphragm, a corner of said first portion being located about at a center of said diaphragm, and wherein said sensing element is located at one side of said first portion, and adjacent to an edge of said diaphragm.

7. The device of claim 6, wherein said first portion of said diaphragm defines a recess along said one side of said first portion.

8. The device of claim 5, further comprising:

a single load resistor formed in said substrate and electrically connected to said sensing element; and a single temperature compensating resistor connected in series to an input terminal of said sensing element.

9. A pressure sensor chip comprising:

a silicon body of a first conductivity type capable of flexing in response to pressure changes and having a principal surface and an opposing back surface;

a first semiconductor region of a second conductivity type formed in said body and extending from said principal surface to a first depth into said body;

a second semiconductor region of the second conductivity type formed in said body adjacent to said first semiconductor region and extending from said principal surface to a second depth less that said first depth into said body;

a single recess defined by said body and extending from said back surface to said first and second semiconductor regions; and a piezo-resistive sensing element formed entirely in said first semiconductor region, whereby an electrical resistance of said sensing element varies with the pressure changes on said body.

10. A method for making a sensor chip comprising the steps of:

providing a silicon substrate having a principal surface;

forming a first recess in a surface of said substrate opposite to said principal surface so as to define a diaphragm;

forming a second recess in said principal surface so as to define a single first portion of said diaphragm which is thinner than a second portion of said diaphragm; and forming a piezo-resistive sensing element entirely in said second portion of said diaphragm.

11. A method for making a sensor chip comprising the steps of:

providing a substrate of a first conductivity type and having a principal surface;

forming a first region in said principal surface having a second conductivity type opposite to said first conductivity type and having a predetermined depth;

forming a second region in said principal surface having said second conductivity type and a depth greater than that of said first region;

etching a single recess in a surface of said substrate opposite to said principal surface, said recess being defined by the depths of said first and second region; and forming a piezo-resistive sensing element entirely in said second region.

12. A pressure sensor chip comprising:

a monocrystalline silicon diaphragm capable of flexing in response to pressure changes and having a first portion having a predetermined thickness, and a second portion having a predetermined thickness less than that of the first portion; and a piezo-resistive sensing element formed in said first portion of said diaphragm, whereby an electrical resistance of said sensing element varies with the pressure changes on said diaphragm;

wherein said first portion of said diaphragm is triangular in shape in a plane of said diaphragm, a corner of said first portion being located about a center of said diaphragm and wherein said sensing element is located at one said of said first portion, and adjacent to an edge of said diaphragm.

13. The device of claim 12, wherein said first portion of said diaphragm defines a recess along said one side of said first portion.

* * * * *